United States Patent

Stang

[11] 4,124,277
[45] Nov. 7, 1978

[54] PARABOLIC MIRROR CONSTRUCTION

[75] Inventor: Donald A. Stang, Littleton, Colo.

[73] Assignee: Martin Marietta Corporation, Bethesda, Md.

[21] Appl. No.: 768,977

[22] Filed: Feb. 16, 1977

[51] Int. Cl.² ............................................. G02B 5/10
[52] U.S. Cl. .................................. 350/310; 65/106; 264/1; 350/292; 350/293; 350/320
[58] Field of Search ............... 350/292, 293, 310, 320; 264/1; 65/106

[56] References Cited

U.S. PATENT DOCUMENTS

| | | | |
|---|---|---|---|
| 3,136,647 | 6/1964 | Dunkle et al. | 156/197 |
| 3,317,640 | 5/1967 | Jones | 264/1 |
| 3,607,584 | 9/1971 | Becht | 161/4 |
| 3,645,606 | 2/1972 | La Vantine | 350/292 |
| 3,761,208 | 9/1973 | Boudet et al. | 264/1 X |
| 3,841,738 | 10/1974 | Caplan | 350/293 |
| 3,912,380 | 10/1975 | Klein | 350/310 |

FOREIGN PATENT DOCUMENTS 2,215,631  8/1974  France .................................... 350/310

*Primary Examiner*—F. L. Evans

[57] ABSTRACT

A concave mirror construction and a method of making concave mirrors, particularly of large focal length. A normally flat rigid glass mirror is held in a concave configuration under bending stress within its elastic limit by a holding layer of substantially dimensionally stable material bonded thereto. The holding layer is formed by a layer of open-ended expansible cellular material sandwiched between layers of pliable and solidifiable dimensionally stable material. The holding layer is bonded to the glass mirror while the mirror is being mechanically held in a concave configuration under bending stress within its elastic limit. The holding layer is cured in situ to a solid and dimensionally stable state which holds the glass mirror in the concave configuration.

21 Claims, 6 Drawing Figures

PARABOLIC MIRROR CONSTRUCTION

BACKGROUND OF THE INVENTION

This application pertains to the art of mirrors of concave configuration. It is well known that in constructing concave mirrors having large focal lengths it is important to avoid defects which may vary the focal point of the mirror. This consideration may be particularly acute in large focal length mirrors, such as those used for collection of solar energy, where the mirror is constructed of a large number of concave mirrors, each of which must have a relatively precise and tight focus so that a large majority of the rays striking the mirror will be reflected at a common focal point.

It has also been recognized that it has been heretofore difficult to mechanically deform a rigid mirror into a precise concave shape and maintain it in that concave shape without it having defects which might vary the focal point the mirror. This problem is particularly prevalent in constructing paraboloid shaped mirrors. Consequently, in constructing concave mirrors, particularly of large focal length, the most frequently suggested construction techniques have been to either mold a reflective facing layer and a holding layer into the desired shape, or to apply a reflective layer as a coating on a surface which has already been formed in the desired configuration.

SUMMARY OF THE INVENTION

The present invention provides a lightweight, inexpensive concave mirror structure having a reflective facing layer formed by a stiff sheet of rigid material held in a smoothly curved configuration under bending stress within its elastic limit by a holding layer of substantially dimensionally stable material bonded thereto and preventing relaxation of the bending stress in the stiff sheet.

The stiff sheet of rigid material is preferably a mirror and, more particularly, a normally flat glass mirror.

In a preferred arrangement, the holding layer is of multiple ply sandwich-type construction including an expansible opened ended cellular core sandwiched between opposite layers of reinforced synthetic plastic material. The core preferably has a honeycomb configuration and a thickness substantially greater than each layer of synthetic plastic material.

The facing layer may include a plurality of individual rectangular stiff rigid sheets positioned in side-by-side relationship. Where the facing layer is curved to the shape of a paraboloid, each individual sheet in the facing layer is curved to lie on the surface of the paraboloid.

According to the preferred form of the method of the invention a holding layer is formed by an opened ended expansible cellular core sandwiched between a pair of layers of dimensionally stable synthetic plastic material. The synthetic plastic material is pliable in an uncured state, and upon curing it solidifies to a rigid, dimensionally stable state. A stiff sheet of reflective material is mechanically deformed within its elastic limit in such a manner that the reflective surface thereof is formed into a smoothly curved concave configuration. The holding layer is mechanically shaped to conform to the deformed configuration of a portion of the stiff sheet of reflective material. The curable synthetic plastic material is cured to a stiff, dimensionally stable state, and is bonded to the portion of facing layer while the facing layer is held in the mechanically deformed state. Teh holding layer then serves to hold the stiff sheet of reflective material in the mechanically deformed concave configuration.

In a specific embodiment of the method of the invention, the stiff sheet of reflective material and the holding layer are positioned between mold members having cooperating opposed curved mold surfaces conforming to the desired curved configuration of the stiff sheet. The mold members are moved toward one another to compress the holding layer and the rigid sheet between the curved mold surfaces while deforming the stiff sheet and shaping the holding layer into the desired curved configuration. The holding layer is then cured in situ to bond it to the stiff sheet and to form the holding layer into a stiff, dimensionally stable state.

The present invention has been found to provide a relatively inexpensive, and yet accurate method of forming concave mirrors of multi-layer panel construction. Moreover, while the invention relates especially to mirrors of multi-layer panel construction, it is believed that the principles of the invention for comparable multi-layer panels generally, if so desired.

Thus, it is an object of the present invention to provide an improved multi-layer rigid panel construction having a stressed facing layer.

It is another object of the invention to provide an improved concave mirror of multi-layer panel construction.

It is also an object of the invention to provide an improved concave mirror construction which is lightweight and inexpensive to manufacture.

It is an additional object of the invention to provide an improved method of making a multi-layer rigid panel having a stressed facing layer.

It is a further object of the invention to provide an improved method of making a concave mirror of multi-layer panel construction.

It is a further object of the invention to provide an improved method of making a parabolic mirror by mechanically deforming a substantially rigid glass mirror.

BRIEF DESCRIPTION OF THE DRAWING

The further objects and advantages of the invention will become further apparent from the following detailed description taken with reference to the accompanying drawings wherein.

DESCRIPTION OF PREFERRED EMBODIMENTS

Figure 2:
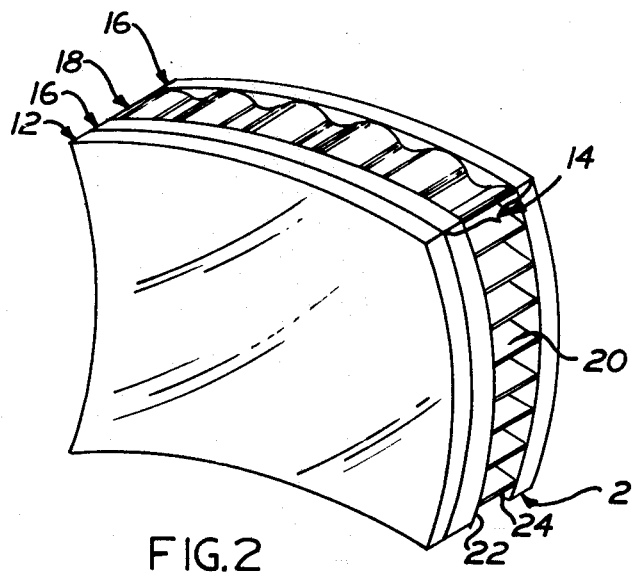
FIG. 2 is a perspective illustration of a concave mirror or a concave mirror portion, constructed in accordance with the principles of the invention.

With reference to the drawings, FIG. 2 shows a concave mirror, or mirror portion, constructed in accordance with the principles of the invention. The mirror is essentially a multi-layer rigid panel having a facing layer 12 formed by a stiff sheet of reflective material held in a deformed configuration under bending stress within its elastic limit by a holding layer 14 of dimensionally stable rigid material bonded thereto and preventing relaxation of the bending stress. The holding layer 14 is substantially dimensionally stable in response to the stress imparted thereto by the bending stress in the facing layer 12.

In the arrangement shown, the holding layer 14 is of multiple ply sandwich-type construction including outer plies 16 bonded to a low density core ply 18 having a thickness substantially greater than each outer ply 16.

The facing layer 12 may be of various materials including metal or synthetic plastic, and in the most preferred arrangement is a glass mirror. By way of example only and not by way of limitation, a multi-layer mirror has been constructed wherein the facing layer 12 was a 12 inch square flat glass mirror having a thickness of 0.090 inch. The glass mirror is made reflective by having its rear surface mirrored in any conventional manner including vapor deposition or sputtering of metal thereon.

The holding layer includes a core ply 18 formed of an expansible cellular material. In the disclosed embodiment the core ply is formed by a paper honeycomb having an open ended hexagonal cell configuration. The honeycomb shaped core ply 18 has a configuration formed by an array of open ended cells 20 which extend from a first side 22 of the honeycomb to a second side 24 of the honeycomb.

The outer plies 16 are each formed by material which is pliable in an uncured state, and which is curable to a rigid, substantially dimensionally stable state. The preferred embodiment contemplates each ply 16 being formed by a sheet of glass cloth impregnated with epoxy resin. The outer plies 16 are disposed against the open-ended sides 22, 24 of the honeycomb core 18. In response to mechanical shaping of the holding layer, and upon curing of the resin the outer plies become bonded to the honeycomb sides and the holding layer rigidifies to a substantially dimensionally stable state having the desired shape. The outer ply 16 which is bonded to side 22 of the honeycomb is also bonded to a portion 26 of the facing layer.

It should be noted that the term "substantially dimensionally stable" material, as used herein, refers to a material which, when bonded to a sheet of stiff material (such as glass) which has been stressed within its elastic limit, is effective to retain its own dimensional integrity in spite of stresses imparted thereto by the stiff material trying to return to its original unstressed state. Therefore, when bonded to a stressed sheet of elastically deformed stiff material, the dimensionally stable material is effective to hold the stiff sheet of material in its deformed state.

Figure 1:
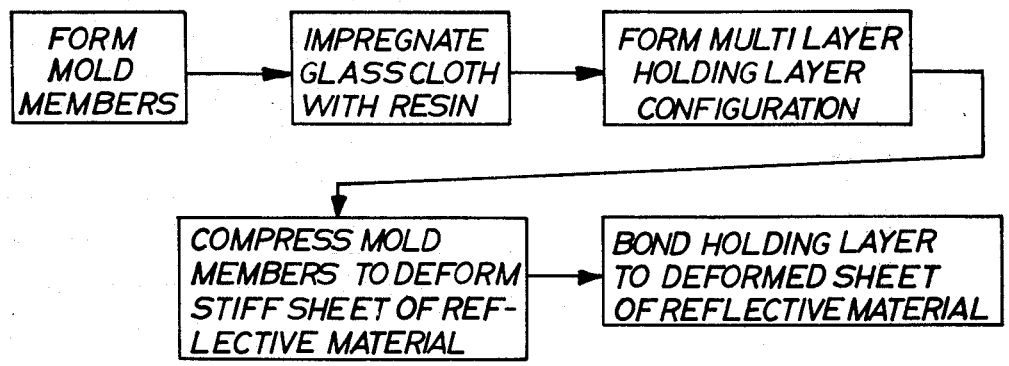
FIG. 1 is a block diagram schematically illustrating the steps of making a concave mirror according to the preferred embodiment of the present invention.
Figure 4:
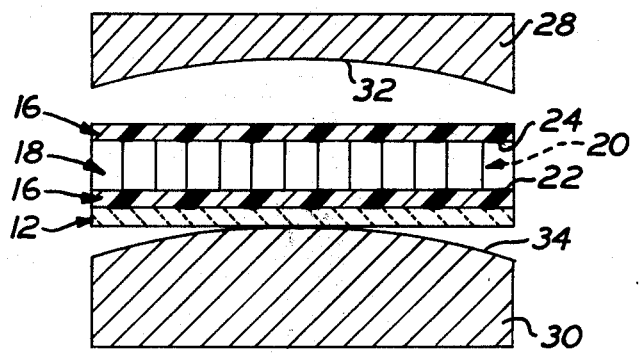
FIG. 4 is a cross-sectional elevational view of a multi-layer panel positioned between opposed mold members.
Figure 5:
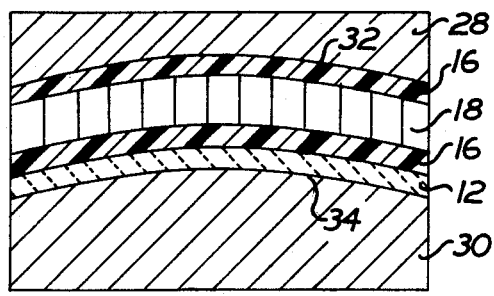
FIG. 5 is a view similar to FIG. 4 showing the mold members moved to the closed position.

The method of forming the mirror may be appreciated by reference to FIGS. 1, 4 and 5. A pair of opposite mold members 28 and 30 are formed having curved upper and lower mold surfaces 32 and 34. To form a mirror of paraboloidal shape the lower surface 34 is formed with a convex paraboloidal shape. The preferred embodiment contemplates first forming the lower mold member 30 out of a plate of aluminum and machining the plate to form the paraboloidal lower surface 34. The upper mold member 28 can then be made by casing molding plaster against the paraboloidal lower surface of the mold member 30.

Figure 6:
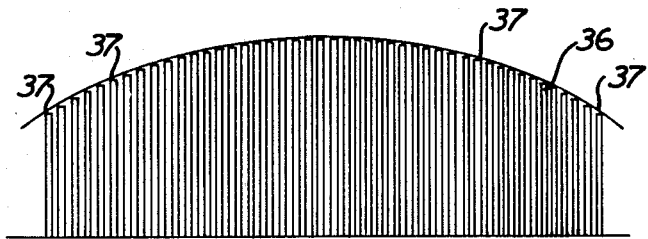
FIG. 6 is a cross-sectional view of a modified form of mold member for practicing the principles of the invention.

It is further contemplated that the lower mold surface may also be formed by a series of thin discs 36 (FIG. 6) having precisely formed outer diameters which are disposed adjacent each other so that their outer edges 37 form a parabolic contour. With such a configuraton, the glass mirror is deformed against such outer edges 37 into the parabolic shape.

With the mold members 32, 34 separated as shown in FIG. 4, a flat rigid glass mirror 12 is positioned between them and adjacent the lower mold surface 34. A first sheet of glass cloth 16 impregnated with epoxy resin is disposed adjacent the mirror 12. A core 18 formed of paper honeycomb is then positioned with one side 22 adjacent sheet 16. Another sheet 16 of glass cloth impregnated with epoxy is then positioned adjacent the other side 24 of the core 18.

While the epoxy is still in an uncured condition, the mold members 28 and 30 are moved toward one another to compress the multi-layer panel between the curved mold surfaces 32 and 34. The multi-layer panel is held in compression between the surfaces 32 and 34. The flat facing layer or sheet 12 is mechanically deformed into a smoothly curved configuration under bending stress within its elastic limit. The holding layer 14 is also formed into that configuration. The mold members 30 and 32 are held closed until the epoxy resin has cured to its rigid state and has bonded the holding layer to the facing layer 12.

A sheet of polyethylene or another release agent may be positioned between the upper mold surface 32 and the outer glass cloth layer 16 to prevent that layer from adhering to the surface 32. In addition, the outer layer 16 adjacent the mold surface 34 may be of double thickness as compared to the layer 16 adjacent the facing layer 12.

Figure 3:
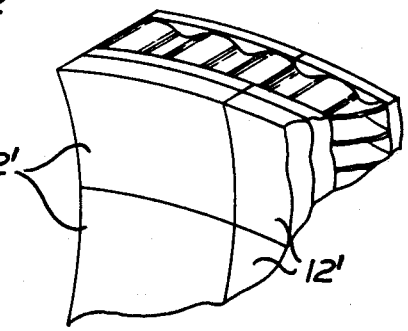
FIG. 3 is a partial perspective illustration of another mirror constructed in accordance with the principles of the invention.

FIG. 3 shows a paraboloidal mirror formed by a series of mirrors 12', each of which is of similar construction as described with respect to FIG. 2. To form the mirror each individual mirror is curved to lie on the surface on the paraboloid.

A mirror of the general type shown in FIG. 2 has been made from four twelve inch square glass mirrors. The resulting mirror had a focal length of approximately 48 feet. Various core materials have been used in making mirrors including hexagonal celled paper honeycomb 2 inches thick. Vertical honeycomb 3 inches thick and commercial grade aluminum hexagonal celled honeycomb has also been used. When aluminum honeycomb is used, a full sheet of the honeycomb may be too stiff and may present difficulties in conforming to the proper contour of the mold surfaces. In such a case, the honeycomb can be cut into a plurality of square which are then placed side-by-side in the fabrication process.

It will be appreciated by those of ordinary skill in the art that it is possible to make the holding layer 14 to the desired curved configuration between a pair of mold members and to then position that holding layer on a flat mirror with suitable adhesive interposed therebetween. The holding layer and the mirror are than placed between the mold members for bending the stiff mirror into the desired configuration while the adhesive cures.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

What is claimed is:

1. A multi-layer rigid panel having a facing layer formed by a stiff sheet of rigid reflective material, said stiff sheet of rigid material being held in a smoothly curved configuration under bending stress within its elastic limit by a holding layer of material bonded to said sheet or rigid material and preventing relaxation of said bending stress, said holding layer being substantially dimensionally stable in response to the stress imparted thereto by said bending stress in said facing layer to maintain said reflective facing layer in said smoothly curved configuration.

2. A multi-layer panel as defined in claim 1 wherein said holding layer comprises a layer of expansible cellular material, a first layer of dimensionally stable material bonded to a first portion of said layer of expansible cellular material and to a portion of said stiff sheet or rigid reflective material, and a second layer of dimensionally stable material bonded to a second portion of said layer of expansible cellular material.

3. A multi-layer panel as defined in claim 2 wherein said expansible cellular material has a honeycomb configuration having an array of open ended cells with common first open ends defining a first side and common second open ends defining a second side, said first layer of dimensionally stable material being bonded to said first side of said expansible cellular material and to said portion of said stiff sheet of rigid material and having a configuration corresponding to the deformed configuration of a portion of said stiff sheet of material, said second layer of dimensionally stable material being bonded to said second side of said expansible cellular material.

4. A multi-layer panel as defined in claim 3 wherein each of said first and second layers of dimensionally stable material comprises reinforced synthetic plastic.

5. A multi-layer panel as defined by claim 4 wherein each of said first and second layer of dimensionally stable material comprises a curable material which is curable in situ while said facing layer and said expansible cellular material are mechanically held in their respective curved configurations under bending stress.

6. A multi-layer panel as defined by claim 5 wherein said facing layer comprises a concave glass mirror.

7. A multi-layer panel as defined by claim 1 wherein said facing layer comprises a concave glass mirror.

8. A multi-layer panel as defined by claim 7 wherein said glass mirror is formed by a plurality of generally rectangular glass mirrors positioned in side-by-side relationship.

9. A multi-layer panel as defined by claim 1 wherein said facing layer comprises a paraboloidal concave mirror.

10. A concave mirror comprising a stiff and rigid glass mirror deformed into a concave configuration under bending stress within its elastic limit and normally being flat when unstressed, and a holding layer of substantially dimensionally stable material bonded to said glass mirror and holding said glass mirror in said concave configuration.

11. A concave mirror as defined by claim 10 wherein said concave configuration is defined by the surface of a paraboloid.

12. A method of making a multi-layer rigid panel having a curved reflective facing layer held under bending stress within its elastic limit by a holding layer of dimensionally stable material bonded thereto, comprising the steps of; providing a facing layer of substantially rigid material, bending said facing layer into a smoothly curved configuration within its elastic limit, bonding a holding layer of substantially dimensionally stable material to said facing layer of rigid material while holding said facing layer in said smoothly curved configuration under bending stress within its elastic limit.

13. The method as set forth by claim 12 wherein said steps of bonding and holding layer to said facing layer comprises the steps of forming a sandwich shaped holding layer from a layer of expansible cellular material disposed between first and second sheets of dimensionally stable pliable and solidifiable material, mechanically applying force to said holding layer to bend said portion of said holding layer to a configuration conforming to the deformed configuration of a portion of said facing layer while said dimensionally stable material is in a pliable state, curing said first and second sheets of dimensionally stable material to a solidified state, removing said force from said holding layer, and bonding said portion of said holding layer to said portion of said facing layer while holding said facing layer in said smoothly curved configuration.

14. The method as set forth by claim 13 wherein said step of mechanically applying force to said holding layer includes the step of placing said facing layer and said holding layer between mold members having cooperating opposed curved mold surfaces conforming to said curved configuration, and moving said mold members toward one another to compress said holding layer and said facing layer between said mold surfaces.

15. A method as defined by claim 13 wherein said step of forming said holding layer includes the steps of placing a first layer of uncured reinforced synthetic plastic material against one side of said facing layer while said facing layer is in an unstressed flat condition, placing one open ended side of a layer of expansible cellular open-ended honeycomb material against said first layer of uncured reinforced synthetic material, and placing a second layer of uncured reinforced synthetic plastic material against the other open ended side of said layer of expansible cellular honeycomb material.

16. A method as set forth by claim 15 wherein said step of mechanically applying force to said holding layer includes the steps of placing said holding layer and said facing layer between opposed mold members having opposed mold surfaces conforming to said curved configuration with one of said layers of uncured plastic material against a portion of said facing layer, and moving said mold members toward one another to compress said facing layer and said holding layer between said mold surfaces.

17. A method as defined by claim 15 including the step of curing said first and second layers of reinforced synthetic plastic material while mechanically applying force to said holding layer and said facing layer.

18. A method as defined by claim 12 wherein said facing layer comprises a substantially flat rigid glass mirror, and said step of bending said facing layer comprises the step of bending a reflective surface of said glass mirror into a concave shape.

19. A method as defined in claim 18 including the step of bending the reflective surface of said glass mirror into a substantially parabolic shape.

20. A method as defined by claim 17 wherein said facing layer comprises a substantially flat rigid glass mirror, and said step of mechanically applying force to said facing layer comprises the step of bending a reflective surface of said glass mirror into a concave shape.

21. A method as defined in claim 20 including the step of bending the reflective surface of said glass mirror into a substantially parabolic shape.

* * * * *